US00RE46833E

(19) United States
(12) Reissued Patent
Diaz

(10) Patent Number: US RE46,833 E
(45) Date of Reissued Patent: May 8, 2018

(54) ELECTRICAL GENERATOR SYSTEM FOR CAPTURING WIND ENERGY ON A MOVING VEHICLE

(71) Applicant: Jose Diaz, Orlando, FL (US)

(72) Inventor: Jose Diaz, Orlando, FL (US)

(21) Appl. No.: 14/618,388

(22) Filed: Feb. 10, 2015

Related U.S. Patent Documents

Reissue of:
(64) Patent No.: 8,618,683
Issued: Dec. 31, 2013
Appl. No.: 13/206,701
Filed: Aug. 10, 2011

(51) Int. Cl.

| | |
|---|---|
| ***B60K 1/00*** | (2006.01) |
| ***F03D 1/04*** | (2006.01) |
| ***B60K 6/48*** | (2007.10) |
| ***B60K 16/00*** | (2006.01) |
| ***F03D 9/00*** | (2016.01) |

(52) U.S. Cl.
CPC ..... *F03D 1/04* (2013.01); *B60K 6/48* (2013.01); *B60K 16/00* (2013.01); *F03D 9/00* (2013.01); *B60K 2016/006* (2013.01); *B60W 2300/125* (2013.01); *F05B 2240/941* (2013.01); *Y02E 10/72* (2013.01); *Y02T 10/6221* (2013.01); *Y02T 10/90* (2013.01)

(58) Field of Classification Search
CPC ..... F03D 9/00; B60K 6/48; B60K 2016/006; F05B 2240/941; Y02T 10/6221
USPC ..... 290/44, 55
See application file for complete search history.

(56) References Cited

U.S. PATENT DOCUMENTS

| | | | | |
|---|---|---|---|---|
| 4,254,843 | A * | 3/1981 | Han et al. | 180/165 |
| 4,314,160 | A * | 2/1982 | Boodman et al. | B60K 16/00 180/2.2 |
| 4,424,452 | A * | 1/1984 | Francis | 290/55 |
| 6,157,147 | A * | 12/2000 | Lin | F16H 47/04 318/11 |
| 6,249,059 | B1 * | 6/2001 | Hosoda | F03D 1/04 290/44 |
| 6,897,575 | B1 * | 5/2005 | Yu | B60K 16/00 180/65.265 |
| 7,135,786 | B1 * | 11/2006 | Deets | B60K 16/00 290/44 |
| 7,802,641 | B2 * | 9/2010 | Friedmann | 180/2.2 |

(Continued)

FOREIGN PATENT DOCUMENTS

| | | | | |
|---|---|---|---|---|
| FR | 2927041 | A1 * | 8/2009 | B60K 6/448 |

*Primary Examiner* — Anjan Deb
(74) *Attorney, Agent, or Firm* — Jason T. Daniel, Esq.; Daniel Law Offices, P.A.

(57) ABSTRACT

A system is disclosed for an electrical generator system for a vehicle. The system includes a wind turbine, an electrical generator mechanically connected to the wind turbine and configured to connect to an electrical energy storage device that is configured to store electrical energy on-board the vehicle, and a rigid, conical [housing, forming] *wind channeling funnel that includes* an interior chamber, the [housing] *funnel* having an inlet end and an outlet end, [the inlet end having a larger diameter than the outlet end, and the conical housing configured to direct] *that directs* wind flow into the wind turbine.

15 Claims, 5 Drawing Sheets

(56) References Cited

U.S. PATENT DOCUMENTS

| | | | | |
|---|---|---|---|---|
| 8,436,485 | B1 * | 5/2013 | Smith | F03D 9/00 290/55 |
| 8,757,300 | B2 * | 6/2014 | Samuel | B60K 16/00 180/165 |
| 2006/0179844 | A1 * | 8/2006 | Verbrugge | B60K 6/387 60/718 |
| 2011/0037261 | A1 * | 2/2011 | Champ et al. | 290/44 |
| 2011/0169273 | A1 * | 7/2011 | Martin | 290/1 A |
| 2013/0101398 | A1 * | 4/2013 | Perry | F03D 3/0427 415/123 |

* cited by examiner

ELECTRICAL GENERATOR SYSTEM FOR CAPTURING WIND ENERGY ON A MOVING VEHICLE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

TECHNICAL FIELD

This disclosure relates to electrical energy production, and more particularly to vehicular energy production utilizing kinetic wind energy.

BACKGROUND

The statements in this section merely provide background information related to the present disclosure and may not constitute prior art.

Many types of hybrid powertrains are known to generate power and propel vehicles including articulated vehicles such as tractor trailers or "semi-trucks." Hybrid powertrains combine a hydrocarbon-powered engine with an electric motor to obtain better gas mileage and reduce vehicle emissions. Engine types are typically compression-ignition or spark-ignition combustion engines. Most hybrid powertrains include an electrical energy storage system such as a bank of rechargeable batteries for powering the electric motor as well as for powering sub-systems, such as lighting, A/C, and radio, contained within the vehicle. Electrical energy storage systems are generally not able to store a sufficient amount of electrical energy to allow the vehicle to be operated for an extended range, generally depleting the electrical energy storage supply more quickly than desired. Therefore, the owners of these vehicles are required to use additional external sources of energy to periodically recharge the electrical energy storage device.

Known on-board methods for recharging the batteries include solar power and thermoelectric waste energy conversion. These methods of providing energy are generally insufficient for generating or improving vehicle electrical efficiency. In the case of solar power, the solar panels are limited to day-time and weather appropriate conditions when the sun shines. Additionally, solar panels can be expensive and prohibitive to cost conscience consumers. Further, solar panels and thermoelectric devices do not generate sufficient electrical energy to fully charge most vehicle electrical energy storage devices during vehicle operation.

Therefore, it would be advantageous to generate electricity on-board a vehicle using kinetic wind energy from ambient wind flow and/or wind flow generated with respect to motion of the vehicle and additionally to selectively propel the vehicle and store the generated electrical energy.

SUMMARY

A system is disclosed for an electrical generator system for a vehicle. The system includes a wind turbine, an electrical generator mechanically connected to the wind turbine and configured to connect to an electrical energy storage device that is configured to store electrical energy on-board the vehicle, and a rigid, conical [housing], *wind channeling funnel*, forming an interior chamber, the [housing] *funnel* having an inlet end and an outlet end, [the inlet end having a larger diameter than the outlet end, and the conical housing] *that is* configured to direct wind flow into the wind turbine.

Certain embodiments of the disclosure include a wind [channeling housing] *deflecting apparatus* contiguously connected to the conical [housing] *wind channeling funnel* and configured to divert wind flow into the conical [housing] *wind channeling funnel*. The wind [channeling housing] *deflecting apparatus* is particularly useful for articulated vehicles having a hitched trailer. The wind [channeling housing] *deflecting apparatus* is preferably configured to concurrently divert wind around the hitched trailer and into the conical [housing] *wind channeling funnel*. In one embodiment, the wind [channeling housing] *deflecting apparatus* is mountable on a roof of the vehicle, preferably aerodynamically formed to the roof of the vehicle.

This summary is provided merely to introduce certain concepts and not to identify key or essential features of the claimed subject matter.

BRIEF DESCRIPTION OF THE DRAWINGS

One or more embodiments will now be described, by way of example, with reference to the accompanying drawings, in which.

DETAILED DESCRIPTION

Figure 1:
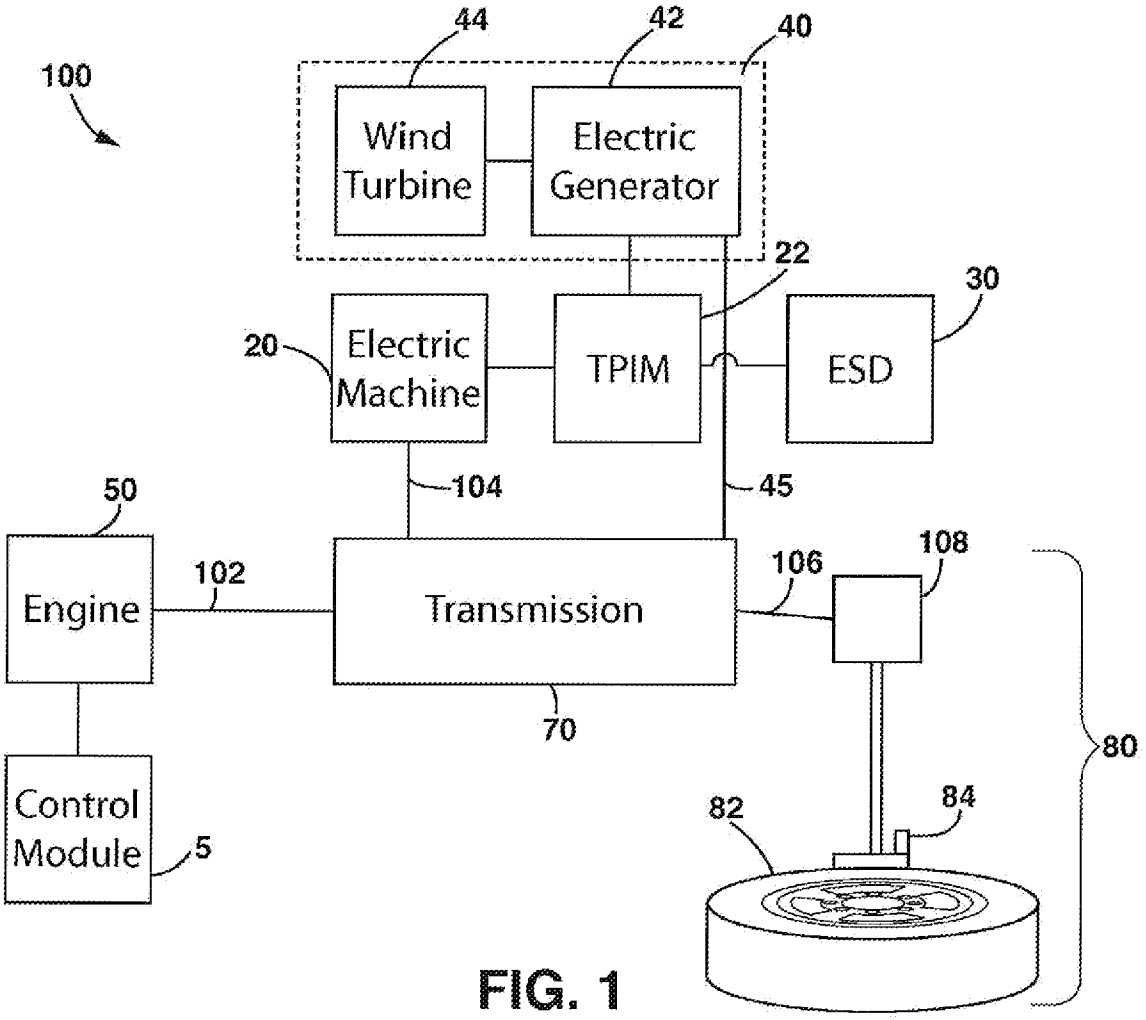
FIG. 1 schematically shows an exemplary hybrid powertrain of a vehicle, in accordance with the present disclosure.

Referring now to the drawings, wherein the depictions are for the purpose of illustrating certain exemplary embodiments only and not for the purpose of limiting the same, FIG. 1 depicts an exemplary hybrid powertrain 100. The exemplary hybrid powertrain depicted in FIG. 1 includes an electro-mechanical hybrid transmission 70 operatively connected to an engine 50, an electric machine 20, and an electric generation system 40. The electric generation system 40 includes an electric generator 42 and a wind turbine 44. The engine 50, electric machine 20 and the electric generation system 40 each generate power which can be transferred to the transmission 70. In one embodiment, functions performed by the electric machine 20 and the electric generation system 40 may be incorporated into a single electric machine as will be apparent to one skilled in the art upon a reading of the disclosure herein below.

The exemplary engine 50 comprises a multi-cylinder internal combustion engine selectively operative in several states to transfer torque to the transmission 70 via an input shaft 102, and can be either a spark-ignition or a compression-ignition engine. The engine 50 includes a crankshaft operatively coupled to the input shaft 102 of the transmission 70. A rotational speed sensor can be included in one embodiment to monitor rotational speed of the input shaft 102. Power output from the engine 50, comprising rotational speed and engine torque, can differ from the input speed and the input torque to the transmission 70 due to placement of torque-consuming components on the input shaft 102 between the engine 50 and the transmission 70, e.g., a hydraulic pump and/or a torque management device.

The exemplary transmission 70 may include any number of planetary-gear sets and selectively engageable torque-transferring devices, i.e., clutches depending on transmission performance requirements for a particular application. As used herein, clutches refer to any type of friction torque transfer device including single or compound plate clutches or packs, band clutches, and brakes, for example, and may include hydraulically-applied rotating friction clutches or hydraulically-controlled stationary devices that can be selectively grounded to a transmission case. Each of the clutches is preferably hydraulically applied, selectively receiving pressurized hydraulic fluid via the hydraulic control circuit.

The electric machine 20 is preferably a three-phase AC machine including a stator and a rotor. The motor stator for each machine is grounded to an outer portion of the transmission case, and includes a stator core with coiled electrical windings extending therefrom. The rotor for the electric machine 20 is supported on a hub plate gear that is operatively attached to a shaft 104 via a planetary gear set of the transmission 70.

The electrical generator 42 preferably includes a stator, rotor, and/or additional components configured to generate electrical power using mechanical power. In one embodiment, the electrical generator 42 is additionally configured to selectively operate as an electric motor. The electric motor may serve, in particular applications, as a supplemental or backup pump to drive flow of the liquid. Additionally, the electrical generator 42 may be configured to selectively operate in forward and reverse directions when operating as either a motor or a generator. The rotor for the electrical generator 42 may be supported on a hub plate gear that is operatively attached to a shaft via a planetary gear set of the transmission 70. The electrical generator 42 is mechanically connected to a wind turbine 44 configured to convert kinetic wind energy from wind flow into mechanical energy. The electrical generator 42 is operatively attached to an output member 106 via a planetary gear set of the transmission 70 to provide torque to a driveline 80 when so mechanically engaged.

The hybrid powertrain 100 includes the output member 106, e.g. a shaft, which is mechanically connected to the driveline 80 of a vehicle via a mechanical junction 108, to provide output power to vehicle wheels 82, one of which is shown in FIG. 1. The output power at the output member 106 may be characterized in terms of an output rotational speed and an output torque. Each of the vehicle wheels 82 is preferably equipped with a sensor 84 adapted to monitor wheel speed, the output of which is monitored by the control module 5.

The input torque from the engine 50 and the motor torques from the electric machine 20 are generated as a result of energy conversion from fuel or electrical potential stored in an electrical energy storage device (hereafter 'ESD') 30. The ESD 30 is electrically connected to a transmission power inverter module 22 (hereafter 'TPIM').

The TPIM 22 is configured to transmit electrical power to and from the electrical generator 42 in response to electrical production. The TPIM 22 is further configured to transmit electrical power to and from the electric machine 20 to meet the torque commands for the electric machine 20. Electrical current is transmitted to and from the ESD 30 in accordance with whether the ESD 30 is being charged or discharged. In one embodiment, the TPIM 22 includes electrical power inverters and respective motor control modules configured to receive the torque commands and control inverter states therefrom for providing motor drive and/or electrical generation functionality to meet the commanded motor torques and electrical storage requests. The power inverters include known complementary three-phase power electronics devices, and each includes a plurality of insulated gate bipolar transistors for converting DC power from the ESD 30 to AC power for powering the electric machine 20 and for modulating generated electrical power from the electric generator 42 and regulating electrical voltage. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power and transform it to or from three-phase AC power, which is conducted to or from the electric machine 20 for operation as a motor or generator.

Components of the hybrid power train 100 are preferably communicatively connected to a control module 5, which may be implemented as one or more components as part of a distributed powertrain control system. The control module 5 synthesizes pertinent information and inputs, and executes algorithms to control various actuators to meet control objectives, including control and operation of the ESD 30, the electric machine 20, and the electric generation system 40. The control module 5 includes engine control functions, a user interface is operatively connected to a plurality of devices through which a vehicle operator controls or directs operation of the electro-mechanical hybrid powertrain such as via an accelerator pedal and an operator brake pedal. Elements of a distributed powertrain control system may communicate with other control modules, sensors, and actuators via a local area network bus.

The control module 5 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. The control module 5 has a set of control algorithms, comprising resident program instructions and calibrations stored in one of the storage mediums and executed to provide the respective functions of each computer. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

In response to operator input via the accelerator pedal and brake pedal as captured by the user interface, the control module 5 determines torque commands to control the torque generative devices comprising the engine 50 and electric machine 20 to meet the operator torque request at the output member 106 and transferred to the driveline 80. Based upon input signals from the user interface and the hybrid powertrain including the ESD 30, the control module 5 determines the operator torque request, a commanded output torque from the transmission 70 to the driveline 80, an input torque from the engine 50, clutch torques for the torque-transfer clutches of the transmission 70; and the motor torques for the electric machine 20, respectively.

The control module 5 manages electrical power inputs from the electric generation system 40 to the ESD 30 based upon monitored operation of the torque-generative devices and the wind turbine 44. In one embodiment, the electric generator 42 stores electrical energy in the ESD 30 when the monitored or determined vehicle speed is less than a predetermined threshold, e.g., 55 miles per hour, and powers the electric machine 20 to contribute to torque generation when the monitored or determined vehicle speed is greater than a predetermined threshold.

Figure 2:
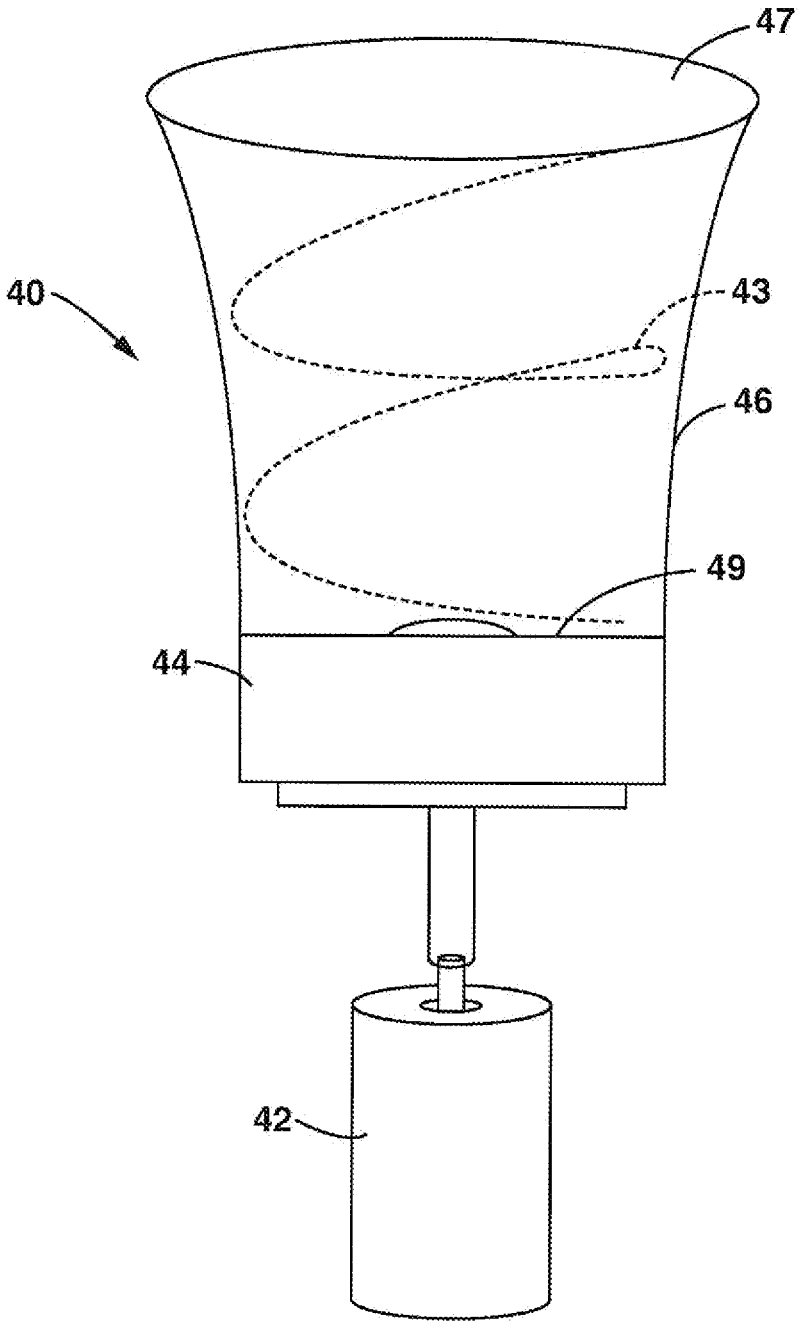
FIG. 2 is a side view of an electric generation system, in accordance with the present disclosure.

FIG. 2 is a side view of the electric generation system 40. As described herein above, the electric generation system 40 includes the wind turbine 44 and the electric generator 42. In one preferential embodiment, the electric generation system 40 further includes a wind channeling funnel 46. The wind channeling funnel 46 [is] *can* preferably *include* a rigid, conical housing that forms an interior chamber configured to direct wind flow into the wind turbine 44. The wind channeling funnel 46 includes an inlet end 47 and an outlet end 49[, the inlet end 47 having a larger diameter than the outlet end 49]. The interior chamber of the wind channeling funnel 46 [includes] *can further include* spiraling parabolic indentations 43, i.e., channels, configured to rotationally direct wind flow to the outlet end 49. Although a single indentation 43 is shown in FIG. 2, one skilled in the art will readily appreciate that multiple additional indentation channels may be included in the funnel 46. In one embodiment, additional indentation channel are impressed into an internal surface of the funnel 46 so one or more indentation channels are parallel to one another. The indentation channels are configured to affect wind flow by bending wind flow into spiraling motion or vortex from the inlet end 47 to the outlet end 49.

Figure 3:
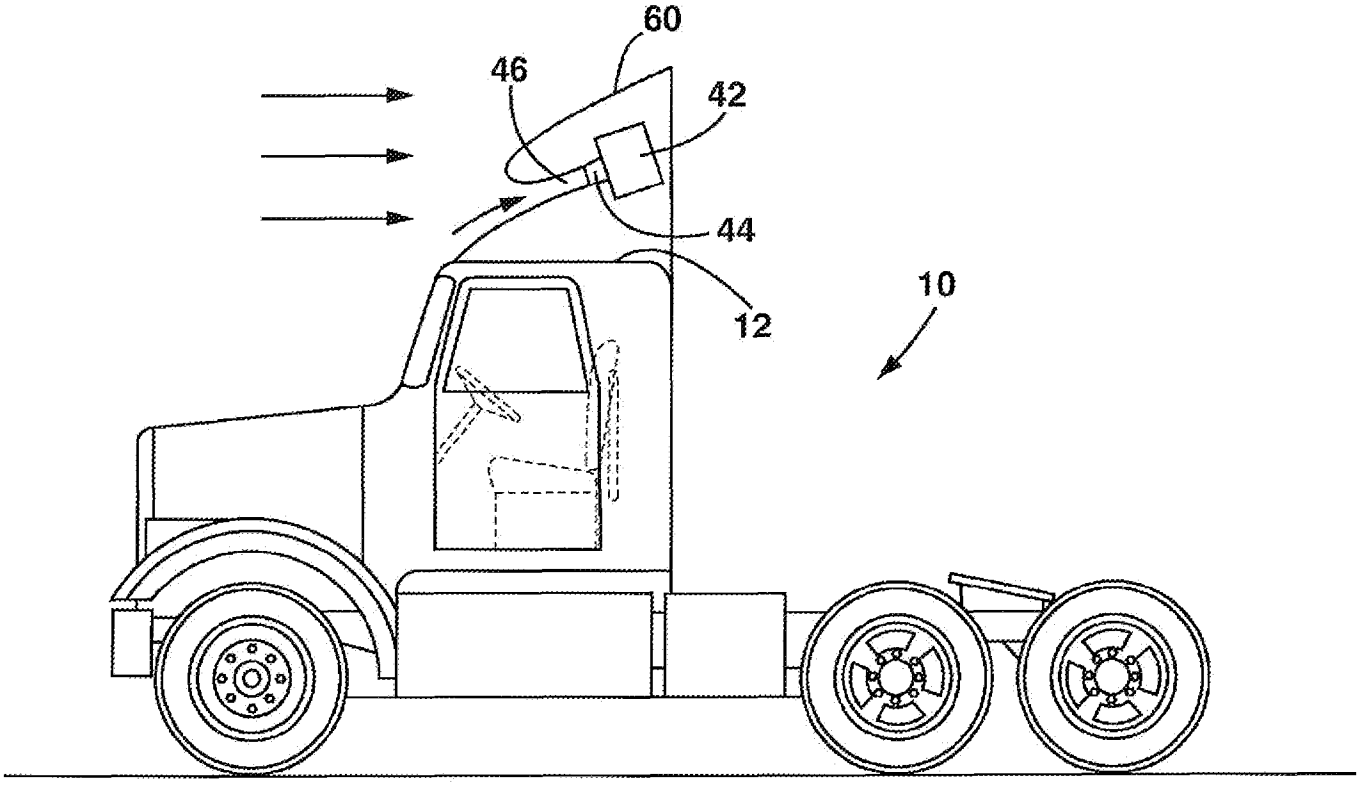
FIG. 3 shows a cross-sectional side view of an exemplary articulated vehicle including a wind deflecting apparatus containing at least part of the electric generation system, in accordance with the present disclosure.

FIG. 3 shows a cross sectional side view of an exemplary articulated vehicle 10 including a wind deflecting apparatus 60 containing at least part of the electric generation system. The wind deflecting apparatus 60 is contiguously connected to the funnel 46 and configured to divert wind flow into the funnel 46 and around a hitched trailer as described herein below. The wind deflecting apparatus 60 is mountable on a roof 12 of the vehicle 10 using any known secure fastening means such as a nut and bolt assembly, tapered screws, and/or weld.

The electric generator 42 is shown in FIG. 3 as proximately located to the wind turbine 44 such an illustration is for clarity purposes and it should be recognized that the electric generator 42 may be situated in many different locations including external locations of the wind deflecting apparatus 60. The wind deflecting apparatus 60 is configured to aerodynamically form to a roof of the vehicle. In this way, wind flow against a moving vehicle is more efficiently diverted from a vehicle path, thereby reducing drag and increasing vehicle fuel consumption efficiency.

Figure 4:
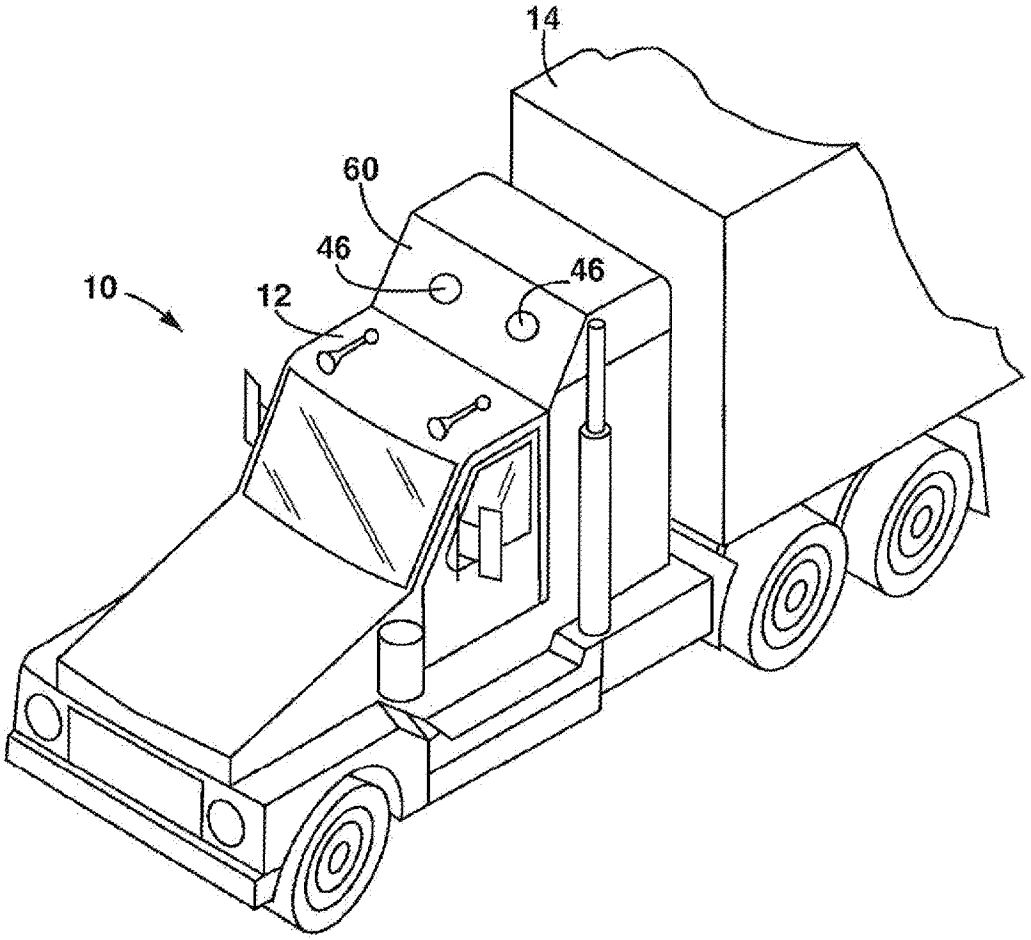
FIG. 4 is a perspective view of the exemplary articulated vehicle including the wind deflecting apparatus, in accordance with the present disclosure.

FIG. 4 is a perspective view of the exemplary articulated vehicle 10 including the wind deflecting apparatus 60. As FIG. 4 shows, the wind deflecting apparatus 60 may include multiple wind channeling funnels 46. Additional funnels 46 are coupled with additional wind turbines. Additional wind turbines may be mechanically connected to additional electric generators or, preferably, mechanically connected to a single electric generator. Increasing the quantity of funnels 46 and wind turbines increases the potential for electrical energy generation of the electric generation system 40. As FIG. 4 shows and as described herein above, the wind deflecting apparatus 60 is configured to deflect wind flow from the articulated vehicle 10 around a hitched trailer 14. In this way, wind resistance from movement of the articulated vehicle 10 is minimized thereby increasing vehicle and engine fuel consumption efficiency. Accordingly, the wind deflecting apparatus 60 is preferably of a shape and dimension adapted to divert flow above a hitched trailer from the vehicle roof 12 and at least as wide.

Figure 5:
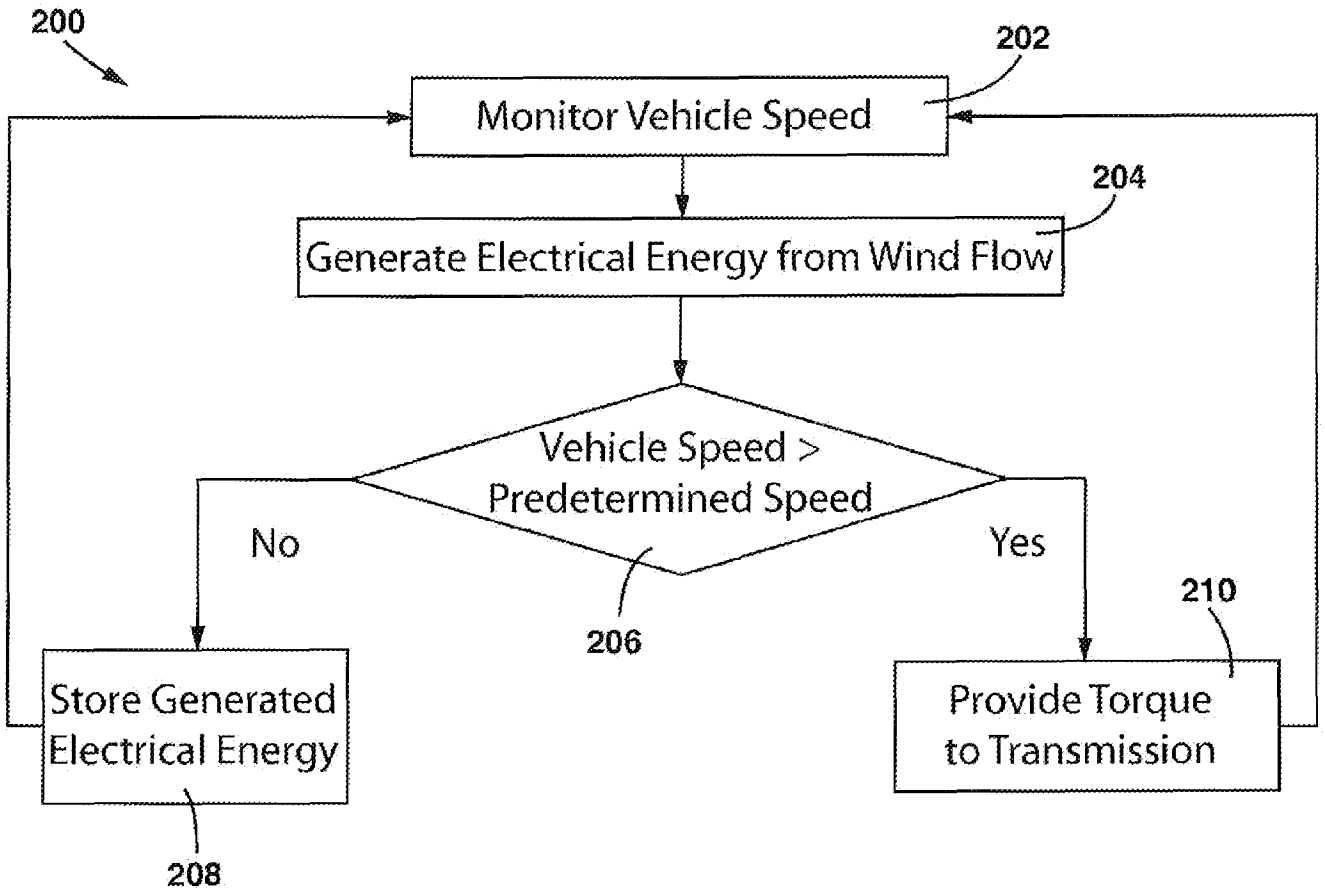
FIG. 5 shows a control scheme for . . . , in accordance with the present disclosure.

FIG. 5 shows a control scheme 200 for controlling the electric generation system 40. Although the control scheme is shown for management of a single electric generation system 40, multiple control schemes may be executed in parallel enabling control of each electric generation system 40 simultaneously. Although the control scheme is shown as discrete elements, such an illustration is for ease of description and it should be recognized that the functions performed by the control scheme may be combined in one or more devices, e.g., implemented in software, hardware, and/or application-specific integrated circuitry (ASIC). For example, the control scheme 200 may be implemented as one or more algorithms in the control module 5.

The control scheme 200 is configured, in one exemplary implementation, to control operation of the electric generation system 40 during vehicle operation. The control scheme 200 includes monitoring vehicle speed 202. As described herein above, vehicle speed may be monitored by utilizing the sensor 84 adapted to monitor wheel speed. Vehicle speed may be determined based upon the monitored wheel speed and known wheel dimensions. Alternatively, one of many other known methods for determining vehicle speed may be determined including, for example, methods based upon monitored axel or driveline speed. Concurrent to monitoring vehicle speed, the control scheme 200 generates electrical energy 204. As described herein above, electrical energy is generated in the electric generator 42 utilizing rotational force generated in the wind turbine 44.

In operation, the control scheme 200 determines whether the vehicle speed is greater than a predetermined vehicle speed 206. If the vehicle speed is less than a predetermined vehicle speed, the control scheme 200 instructs the electric generator 42 to charge the ESD 30 using the generated electrical energy 208. If, however, the vehicle speed is greater than a predetermined vehicle speed, the control scheme 200 instructs the electric generator 42 to engage the driveline 80 via the transmission 70 to contribute torque to propel the vehicle 210. While not illustrated in FIG. 5, one skilled in the art will recognize that additional steps of the control scheme 200 may be performed in parallel and concurrent with the illustrated steps including fault-based monitoring and control including controlling an operating state of the electric generator 42 based upon occurrence of a component or operating fault.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. An electrical generator system for a vehicle, the system comprising:

a wind turbine;

an electrical generator that is mechanically connected to the wind turbine and includes connections for communicating with an electrical energy storage device that is configured to store electrical energy on-board the vehicle, said electrical generator further including a mechanical shaft that is configured to connect to a driveline of the vehicle;

a wind channeling funnel that includes a rigid, conical housing, forming an interior chamber, the funnel having an inlet end and an outlet end *and spiraling parabolic indentations configured to rotationally direct wind flow to the outlet end disposed about the interior chamber*, [the inlet end having a larger diameter than the outlet end, and configured] to direct wind flow into the wind turbine.

[2. The system of claim 1, wherein the interior chamber of funnel further comprises spiraling parabolic indentations configured to rotationally direct wind flow to the outlet end.]

3. The system of claim 1, further comprising:

an inverter electrically connected to the electrical generator and an induction motor connected to the inverter, the inverter configured to invert direct current flowing through a rotor to alternating current to provide power to the induction motor for providing torque to a drivetrain of the vehicle.

4. The system of claim 1, further comprising:

an electric motor configured to Utilize the electrical energy from the electrical energy storage device to produce a motor output; and a control system configured to:

selectively control electrical energy from the electrical energy device, and selectively discharge the electrical energy device to operate the electric motor to produce the motor output.

5. The system of claim 1, further comprising:

a wind deflecting apparatus that is contiguously connected to the wind channeling funnel and configured to divert wind flow into the funnel.

6. The system of claim 5, wherein the wind deflecting apparatus includes an angled front section and an overall shape that functions to aerodynamically form to a roof of the vehicle, and to reduce drag when the vehicle is in motion.

7. The system of claim 1, wherein the wind turbine is configured to convert kinetic wind energy from the wind flow into mechanical energy.

8. The system of claim 7, wherein the electrical generator is further configured to generate electrical energy from the mechanical energy provided by the wind turbine.

9. A system comprising: at least one processing unit; a memory, operatively connected to the at least one processing unit and storing instructions that, when executed by the at least one processing unit, cause the at least one processing unit to perform a method, the method comprising:

monitoring speed of a vehicle, the vehicle including an electric motor configured to provide torque to a drivetrain of the vehicle;

directing wind flow to a wind turbine using a wind channeling funnel having a rigid, conical housing, forming an interior chamber, the housing having an inlet end and an outlet end *and spiraling parabolic indentations configured to rotationally direct wind flow to the outlet end disposed about the interior chamber*, [the inlet end having a larger diameter than the outlet end, the] *and an* outlet end *that is* coupled to the wind turbine;

generating electrical energy utilizing the wind turbine mounted on the vehicle, the wind turbine mechanically connected to an electrical generator, the electrical generator electrically connected to an electrical energy storage device configured to store electrical energy on-board the vehicle, said electrical generator further including a mechanical shaft that is connected to a driveline of the vehicle;

storing electrical energy in the electrical energy storage device when the monitored speed is less than a predetermined threshold; and powering the electric motor with the generated electrical energy when the monitored speed is greater than a predetermined threshold.

[10. The system of claim 9, wherein the interior chamber of the conical housing comprises spiraling parabolic indentations configured to rotationally direct wind flow to the outlet end.]

11. The system of claim 9, further comprising: diverting wind flow into the conical [housing] *wind channeling funnel via* a wind deflecting apparatus that is mounted to a roof of the vehicle.

12. The system of claim 11, wherein the wind deflecting apparatus includes an angled front section and an overall shape that functions to reduce drag when the vehicle is in motion.

13. The system of claim 9, wherein the wind turbine is configured to convert kinetic wind energy from the wind flow into mechanical energy.

14. The system of claim 13, wherein the electrical generator is further configured to generate electrical energy from the mechanical energy provided by the wind turbine.

15. A wind deflection apparatus for an articulated vehicle, the apparatus comprising:

a wind turbine;

an electrical generator mechanically connected to the wind turbine and configured to connect to an electrical energy storage device configured to store electrical energy on-board the vehicle, wherein the electrical generator is further configured to generate electrical energy from the mechanical energy provided by the wind turbine;

a wind deflecting apparatus having an angled front section and an overall shape that functions to aerodynamically form to a roof of the vehicle, and to reduce drag when the vehicle is in motion, the wind deflecting apparatus functioning to divert wind flow into a contiguously attached wind channeling funnel that includes a conical housing, forming an interior chamber, the funnel having an inlet end and an outlet end *and spiraling parabolic indentations configured to rotationally direct wind flow to the outlet end disposed about the interior chamber*, [the inlet end having a larger diameter than the outlet end, and] *that is* configured to direct wind flow into the wind turbine; and a plurality of wind turbines each having a wind channeling funnel *having indentations disposed about the interior chamber* connected thereto; and a plurality of electrical generators that are mechanically connected to one or more of the plurality of wind turbines, said generators being configured to connect to the electrical energy storage device on-board the vehicle, said wind deflecting apparatus being contiguously attached to each of the wind channeling funnels, wherein at least one of the plurality of electrical generators further includes a mechanical shaft that is configured to connect to a driveline of the vehicle.

16. The apparatus of claim 15, wherein the interior chamber of the funnel comprises spiraling parabolic channels configured to rotationally direct wind flow to the outlet end.

17. The apparatus of claim 15, further comprising:

a control system configured to selectively control electrical energy from the electrical energy device, and selectively discharge the electrical energy device to operate an electric motor configured to utilize the electrical energy from the electrical energy storage device to produce a motor output, [to produce the motor output]; and a plurality of sensors that are configured to be disposed on each wheel of the vehicle, said sensors being in communication with the control system and functioning to report a wheel speed.

* * * * *